(No Model.)

A. C. STILSON.
JOURNAL BOX.

No. 469,890. Patented Mar. 1, 1892.

WITNESSES:
R. G. Amius.
L. R. Miller.

INVENTOR
Amos C. Stilson
BY
Hallock and Halleck
ATTORNEYS.

UNITED STATES PATENT OFFICE.

AMOS C. STILSON, OF BRADFORD, PENNSYLVANIA.

JOURNAL-BOX.

SPECIFICATION forming part of Letters Patent No. 469,890, dated March 1, 1892.

Application filed August 23, 1890. Serial No. 362,862. (No model.)

*To all whom it may concern:*

Be it known that I, AMOS C. STILSON, a citizen of the United States, residing at Bradford, in the county of McKean and State of Pennsylvania, have invented certain new and useful Improvements in Journal-Boxes; and I do hereby declare the following to be a full, clear, and exact description of the invention, such as will enable others skilled in the art to which it appertains to make and use the same.

My invention relates to that class of shaft and journal bearings which have rollers provided with cogs or teeth gearing with the teeth or cogs upon the journal-box.
The object of the invention is to improve upon the general construction of this class of devices; and to that end the nature of the invention consists of constructions and combinations, all as will hereinafter be described in the specification, and pointed out in the claim, reference being had to the accompanying drawings, in which—

Figure 1:
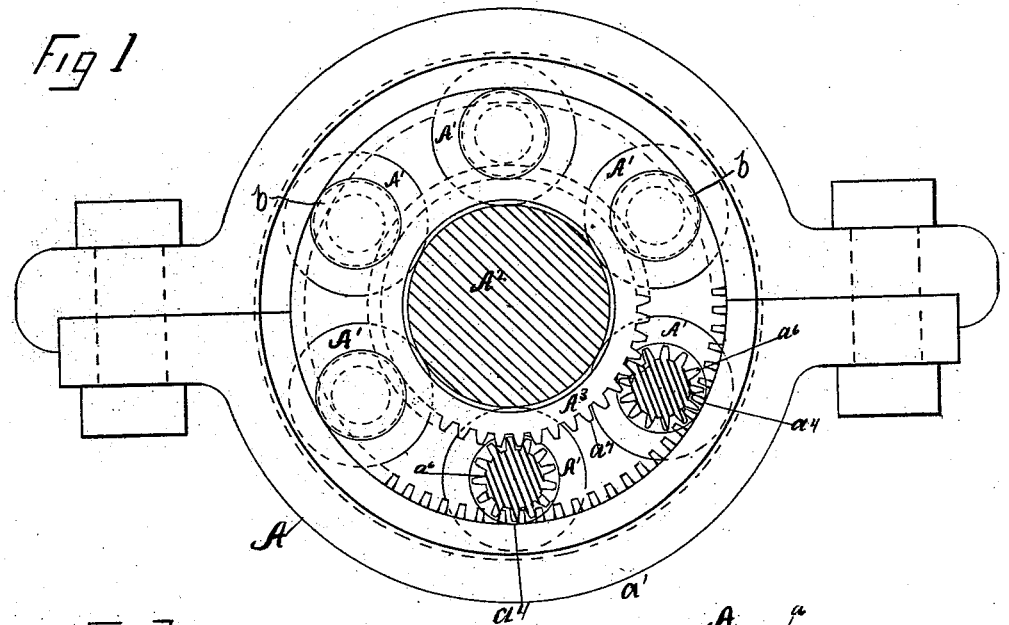
Figure 2:
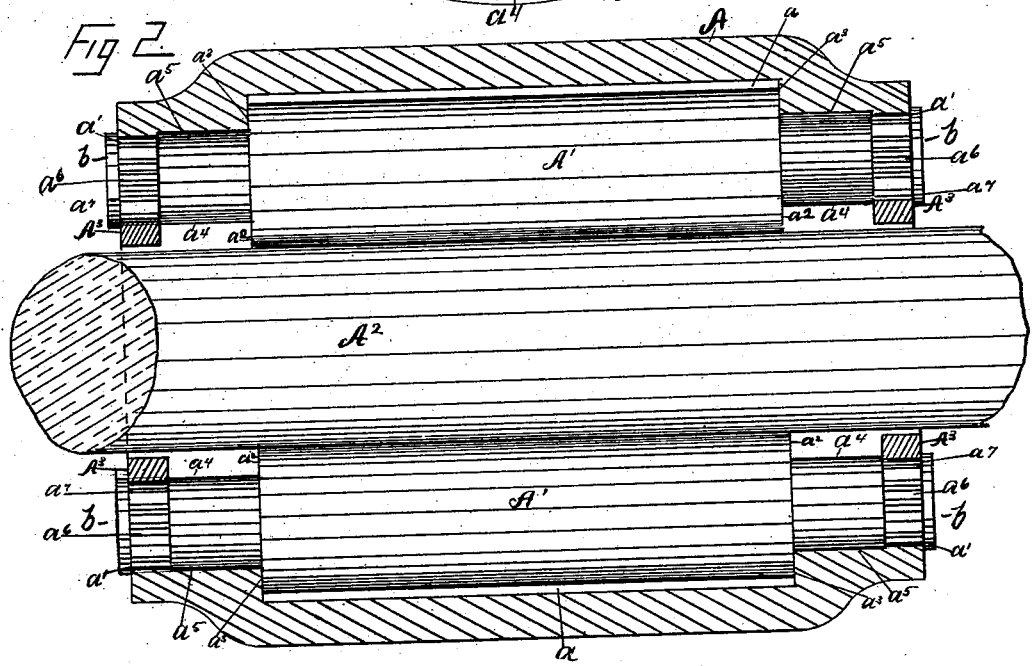

Figure 1 represents an end elevation of the box, two of the collars being removed, the shaft being in section; and Fig. 2, a section of the box proper and the rollers and shaft in elevation.

A represents a box, which may be made in any desired way and is provided with the annular recess $a$ and cogs or teeth $a'$ at each end. In the recess $a$ are placed rollers A' of substantially the same length as the width of the recess $a$, so that the ends $a^2$ of the rollers abut against the shoulders $a^3$, that form the side walls of said recess. The journal of the rollers are the reduced parts $a^4$, which fit snugly against the bearing-faces $a^5$ on the box proper and hold the rollers A' snugly against the shaft or journal $A^2$. The outer ends of each of the rollers are provided with the same number of cogs or teeth $a^6$, that engage with the teeth $a'$ on the box A, and with the teeth $a^7$ of the separate adjusting-rings or intermediate gear $A^3$ encircling the shaft or journal $A^2$.
Upon the ends of the cogs $a^6$ of journals $a^4$ are collars $b$ of substantially the same diameter as the journals. These collars, together with the journals, form walls or stops which serve to keep the rings $A^3$ in place. These rings $A^3$ have a central opening of larger diameter than the shaft, from which they are held from contact by reason of their contact with the cogs or teeth $a^6$. In short, the rollers support the shafting and the rings guide the rollers.

It is obvious that these bearings can be used for shafting, axles, or any device requiring anti-friction rollers.

The operation of the device is as follows: The shaft or journal is revolved in the usual way, and by reason of the contact of its periphery with the periphery of the rollers the latter are revolved. As these rollers are geared to the box and intermediate rings, they move around the box as the shaft or journal turns. The gear or teeth on the box guide the movements of the rollers and the rings adjust the latter, so that they will always be an equal distance from each other, and thus form a firm support for the shaft or journal with the least possible friction.

What I claim as new is—

In a journal-bearing, the combination of a box having a recess and teeth arranged internally in the ends of the box, rollers fitting in said recess and having reduced journals provided with teeth at each end, and the rings $A^3$, provided with a central opening of larger diameter than the shaft, said rings having teeth which mesh with the teeth upon the ends of the rollers, whereby said rings are held from contact with the shaft, substantially as set forth and shown.

In testimony whereof I affix my signature in presence of two witnesses.

AMOS C. STILSON.

Witnesses:
T. F. MULLIN,
REED F. HOWLAND.